Sept. 13, 1927.
E. B. WHEELER
RECORDING DEVICE
Filed Dec. 29, 1922
1,642,525
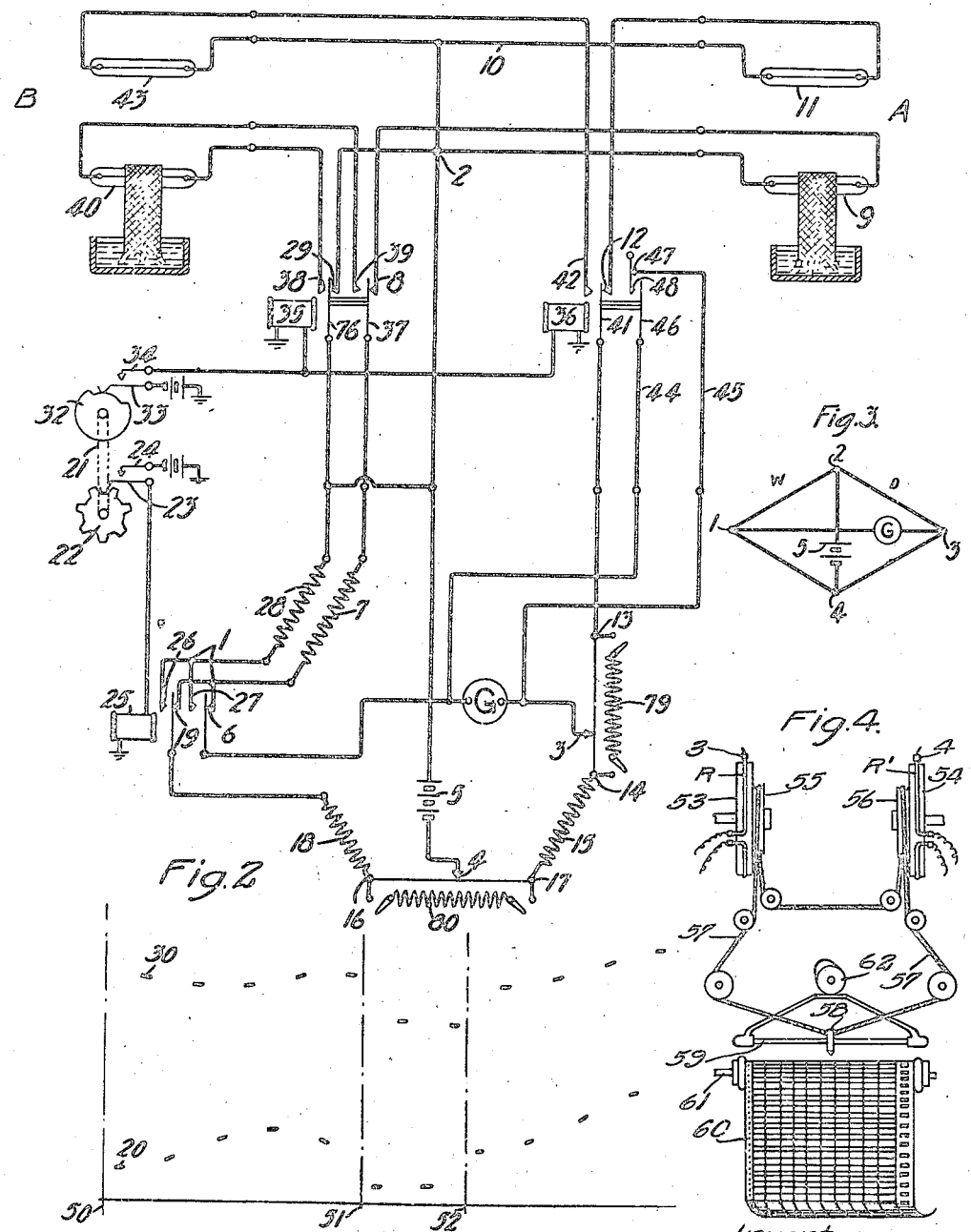
Inventor:
Edmund B. Wheeler.
by Fred L. R. Palmer Atty.

Patented Sept. 13, 1927.

1,642,525

UNITED STATES PATENT OFFICE.

EDMUND B. WHEELER, OF NEW YORK, N. Y., ASSIGNOR TO WESTERN ELECTRIC COMPANY, INCORPORATED, OF NEW YORK, N. Y., A CORPORATION OF NEW YORK.

RECORDING DEVICE.

Application filed December 29, 1922. Serial No. 609,779.

This invention relates to apparatus for recording temperature conditions and particularly to an apparatus for recording dry bulb temperature and a function of wet bulb temperature whereby the variation in relative humidity over a given period can be calculated.

The object of the invention is in general to record temperature conditions at a plurality of stations by means of a single recorder.

In accordance with the general features of the invention, atmospheric conditions at a station are determined by means of Wheatstone bridge measurements made upon dry and wet resistance thermometers located at the station. Means are provided for cyclically obtaining a bridge balance with only the dry thermometer associated with the bridge thereby indicating directly dry bulb temperature. Means are provided also for cyclically connecting the wet thermometer with the bridge in such a manner that the resistances of the dry bulb and wet bulb differentially affect the balance. With this arrangement the bridge balance indicates the difference between the temperature of the dry bulb and the temperature of the wet bulb. A second station at which it is desired to determine the atmospheric conditions is equipped with an additional pair of thermometers and means are provided for cyclically disconnecting the thermometers of one station from the bridge and substituting the thermometers of the other station. The Wheatstone bridge is automatically balanced and the results of each balance graphically recorded by means of the mechanism described in U. S. patent to Leeds 1,125,699, January 19, 1915. The balancing and recording mechanism forms no part of the present invention and is, therefore, not believed that a detailed description of such mechanism is necessary.

Referring to the drawing, Fig. 1 illustrates schematically the arrangement of the Wheatstone bridge and the resistance thermometers at the two stations. Fig. 2 illustrates diagrammatically the graphical record obtained. Fig. 3 is a simplified diagram illustrating a Wheatstone bridge, which forms the basis of the circuit of Fig. 1. Fig. 4 represents the general scheme of balancing the bridge and recording.

In both Figs. 1 and 3, the bridge comprises corners 1, 2, 3, and 4; a galvanometer G; and a supply battery 5. With the relays in the non-operated position as indicated in Fig. 1, arm 1—2 of the bridge comprises fixed resistance 7, relay contact 8, and wet resistance thermometer 9. Arm 2—3 of the bridge comprises conductor 10, dry resistance thermometer 11, relay contact 12, and a portion of slide wire 13—14. Bridge arm 3—4 comprises a section of slide wire 13—14, fixed resistance 15 and a section of slide wire 16—17. Arm 4—1 comprises a section of slide wire 16—17, fixed resistance 18, and relay contact 19. It is seen that in this condition, arms 1—2 and 2—3 contain the resistance thermometers 9 and 11 respectively and hence a balance of the bridge will give directly a measure of the difference between the resistance of the thermometers 9 and 11, and hence a measure of the difference in temperature of the two thermometers. The bridge is balanced by shifting points 3 and 4 along the slide wires, which shifting is automatically accomplished by means of the apparatus shown schematically in Fig. 4 in which discs of wood or other insulating material 53 and 54 have resistance units, R and R' respectively, in the form of a helix mounted on them. R and R' are represented in Fig. 1 by the resistance elements 13—14 and 16—17, respectively. Contacts 3 and 4 coact with units R and R' respectively. Leads extend from the ends of these resistance units and from the contacts 3 and 4 to the bridge.

When the indicator of the galvanometer G shows an unbalance in the bridge, the discs 53 and 54 are rotated either individually or together until the condition of unbalance is removed, as shown and described in detail in said patent to Leeds.

Attached to discs 53 and 54 are pulleys 55 and 56. A cord or belt 57 passes over these pulleys and by means of other pulleys moves pen 58 along the rod 59 to the position corresponding to the temperature indicated by the bridge balance.

A properly calibrated sheet 60 passes over roll 61. At regular intervals some device, such as cam 62, causes pen 58 to contact with sheet 60 making a mark thereon, as shown and described in said patent to Leeds.

With the apparatus in the positions shown in Fig. 1, this mark represents the difference in temperatures of the dry bulb and the wet bulb thermometers.

A shaft 21 is driven at constant speed by a motor (not shown) thereby periodically causing contact to be made between contacts 23 and 24, for actuating relay 25. With relay 25 in the operated position, arms 2—3 and 3—4 remain unaltered and arm 4—1 remains the same except that relay contact 26 is substituted for contact 19. Arm 1—2 now comprises fixed resistance 28 which is connected directly to point 2, thus rendering wet bulb 9 inactive in connection with the circuit. The bridge is automatically balanced as before but in this case the balance obtained is a function of the resistance of the dry bulb alone and hence the balance indicates directly dry bulb temperture and the recording apparatus automatically marks a point such as 30 indicating the dry bulb temperature.

As cam 22 revolves contacts between 23 and 24 is periodically made and broken, thus periodically causing relay 25 to be in the operated and non-operated position so that points are alternately plotted on the record sheet giving dry bulb temperature and difference between dry bulb and wet bulb temperature for station A at which thermometers 9 and 11 are located.

Shaft 21 carries a second cam 32 which periodically makes and breaks contacts between contacts 33 and 34 thus bringing relays 35 and 36 synchronously into the operated and non-operated position. When relay 35 is brought into the operated position, armatures 76 and 37 are transferred to contacts 38 and 39 respectively, breaking contact with 29 and 8 respectively. It is apparent that this change merely substitutes wet bulb thermometer 40 for wet bulb thermometer 9. When relay 36 is shifted from the non-operated to operated position, armature 41 breaks its contact with contact 12 and makes contact with contact 42, which obviously substitutes dry bulb thermometer 43 for dry bulb thermometer 11.

While relays 35 and 36 are being shifted from the non-operated to operated position or vice versa, it is apparent bridge arms are open and hence the bridge will be greatly unbalanced. In order to prevent violent deflections of the galvanometer during such intervals, low resistance leads 44 and 45 are run from the terminals of the galvanometer to relay armature 46 and contact 47, respectively, which are arranged to short-circuit the galvanometer during these intervals when relay armatures 76, 37 and 41 are changing connections. The adjustments of armature 46, and contacts 47 and 48 are such that when relay 36 is brought into operation, contact 46 is immediately brought into contact with 48 thus short-circuiting the galvanometer before any contacts are broken. As armature 46 moves to the left contact 47 follows for a distance remaining in contact with 48 until the circuit changes brought about by armatures 76, 37 and 41 have been completed. After that the contact is broken between contacts 47 and 48 thus leaving the galvanometer operable for the next balance. On the return of relay 36 to the non-operated position the short-circuiting of the galvanometer is similarly accomplished.

Thermometers 9, 11, 40 and 43 may be resistance thermometers of any well known and suitable type. Thermometers consisting of a length of calibrated platinum wire enclosed in a protective casing have been found to be suitable for the purpose.

It is seen that under the control of cam 22, the bridge will alternately record dry bulb temperature and difference between dry bulb and wet bulb temperature for whichever of stations A or B is associated with the bridge by means of the relays controlled by cam 32. In order that the recording for either station A or station B will not be interrupted until several dots have been obtained on each curve, cam 22 is arranged to actuate contacts 23 and 24 with a much greater rapidity than cam 32 actuates contacts 33 and 34.

The records for both stations A and B are plotted on the same curve sheet and in order that the curves for the two stations may be readily distinguished, cam 32 is arranged to keep relays 35 and 36 in the operated position for a greater time than they remain in the non-operated position. In this way, a curve sheet is obtained with the dots arranged similar to the arrangement shown in Fig. 2 in which the period of time from 50 to 51 shows the condition at station B, whereas from 51 to 52 shows the condition at station A, etc. This arrangement makes it very easy to distinguish between the curves for the two stations A and B.

It is apparent that by means of this invention, a single recorder may be used to record atmospheric conditions at separated stations which may, for example, be so located that one station gives outdoor weather conditions and the other indoor weather conditions. This effects a great saving in the cost of recorders and a corresponding saving in the cost of attendance and maintenance.

Although the invention has been described in connection with the recording of atmospheric conditions, it is not limited to this application, but may be used for nearly any purpose where it is desired to record temperatures and temperature differences at a plurality of points.

To obtain the greatest accuracy with the apparatus, all lead wires and relay contacts should have low resistances. If desired the accuracy also may be improved by making slide wires 13—14 and 16—17 of substantial resistance and providing them with low resistance shunts 79 and 80 respectively.

What is claimed is:

1. A recording device comprising a pair of resistance thermometers, one being of the wet bulb type and the other being of the dry bulb type, a Wheatstone bridge, means for inserting said resistance thermometers respectively into different legs of said bridge, means for causing said bridge to record alternately dry bulb temperature and difference between dry bulb and wet bulb temperature, a second pair of resistance thermometers, and means for substituting said second pair of thermometers for said first pair of thermometers.

2. A recording device comprising a pair of resistance thermometers, one being of the dry bulb type and the other being of the wet bulb type, a Wheatstone bridge, means for inserting said resistance thermometers respectively into different legs of said bridge, means for causing said bridge circuit to record alternately a function of dry bulb temperature and a function of wet bulb temperature, a second pair of resistance thermometers, and means for substituting said second pair of thermometers for said first pair of thermometers.

3. A recording device comprising a pair of resistance thermometers, one being of the dry bulb type and the other being of the wet bulb type, a Wheatstone bridge, means for inserting said resistance thermometers respectively into different legs of said bridge, means for causing said bridge circuit to record alternately dry bulb temperature and difference between dry bulb and wet bulb temperature, a second pair of resistance thermometers, relay means for substituting said second pair of thermometers for said first pair of thermometers, and an interrupter for controlling the periodic operation of each of said relay means.

4. A recording device comprising a pair of resistance thermometers, an automatically balanced bridge, means for inserting said resistance thermometers respectively into different legs of said bridge, means for causing said bridge circuit alternately to record the temperature of one thermometer and the difference between the temperature of the two thermometers, a second pair of resistance thermometers, and means for substituting said second pair of thermometers for said first pair of thermometers.

5. A recording device comprising a pair of resistance thermometers, a Wheatstone bridge, means for inserting said resistance thermometers respectively into different legs of said bridge, means for causing said bridge circuit to record alternately the temperature of one thermometer and the difference between the temperatures of the two thermometers, a second pair of resistance thermometers, and means for periodically substituting said second pair of thermometers for said first pair of thermometers.

In witness whereof, I hereunto subscribe my name this 28th day of December, A. D. 1922.

EDMUND B. WHEELER.